Sept. 19, 1939.　　　　G. A. HUMASON　　　　2,173,743
VALVE FOR CHOKES
Filed Dec. 1, 1936　　　　2 Sheets-Sheet 1
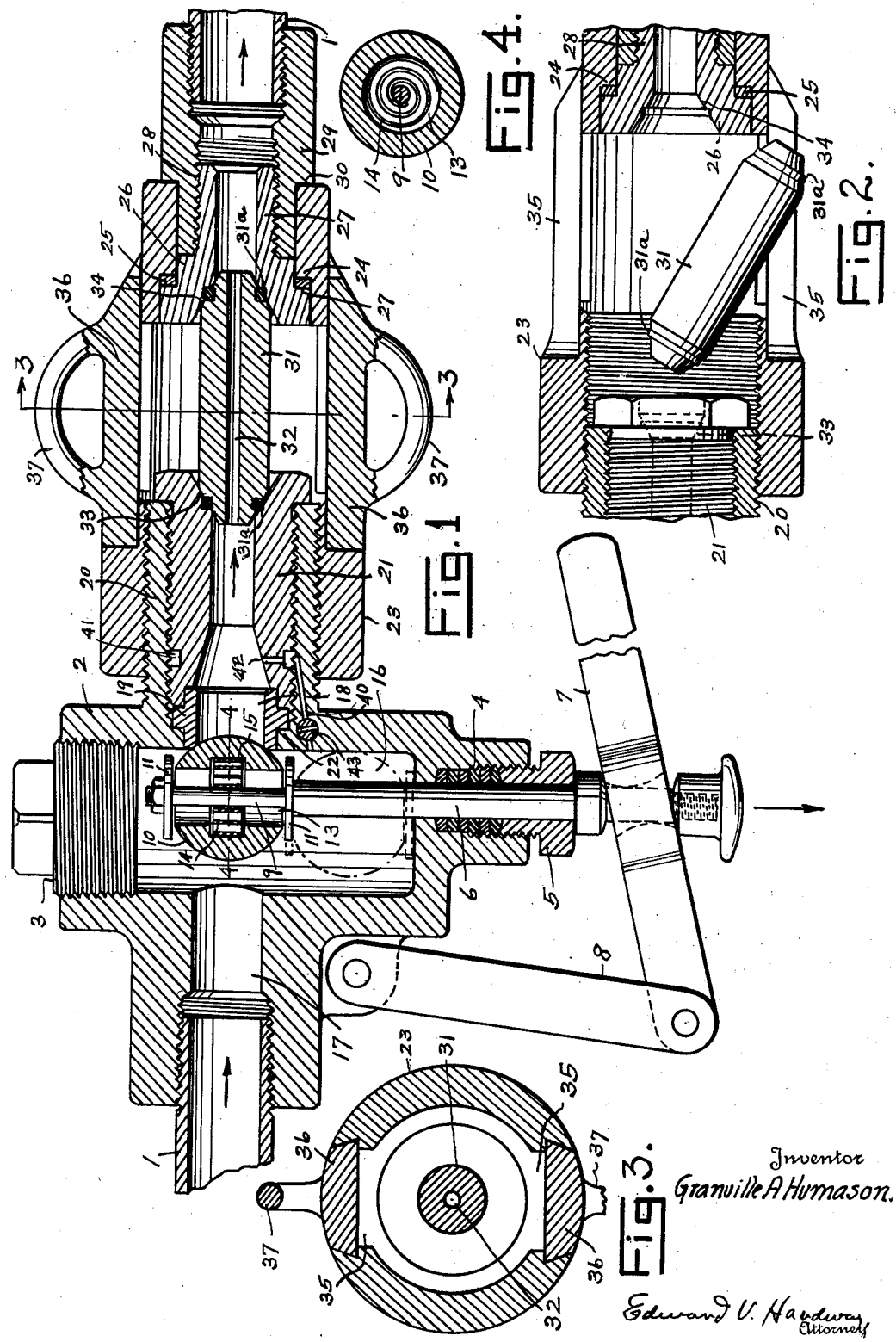
Inventor
Granville A. Humason.
Edward V. Hardway
Attorney Sept. 19, 1939.  G. A. HUMASON  2,173,743
VALVE FOR CHOKES
Filed Dec. 1, 1936  2 Sheets-Sheet 2
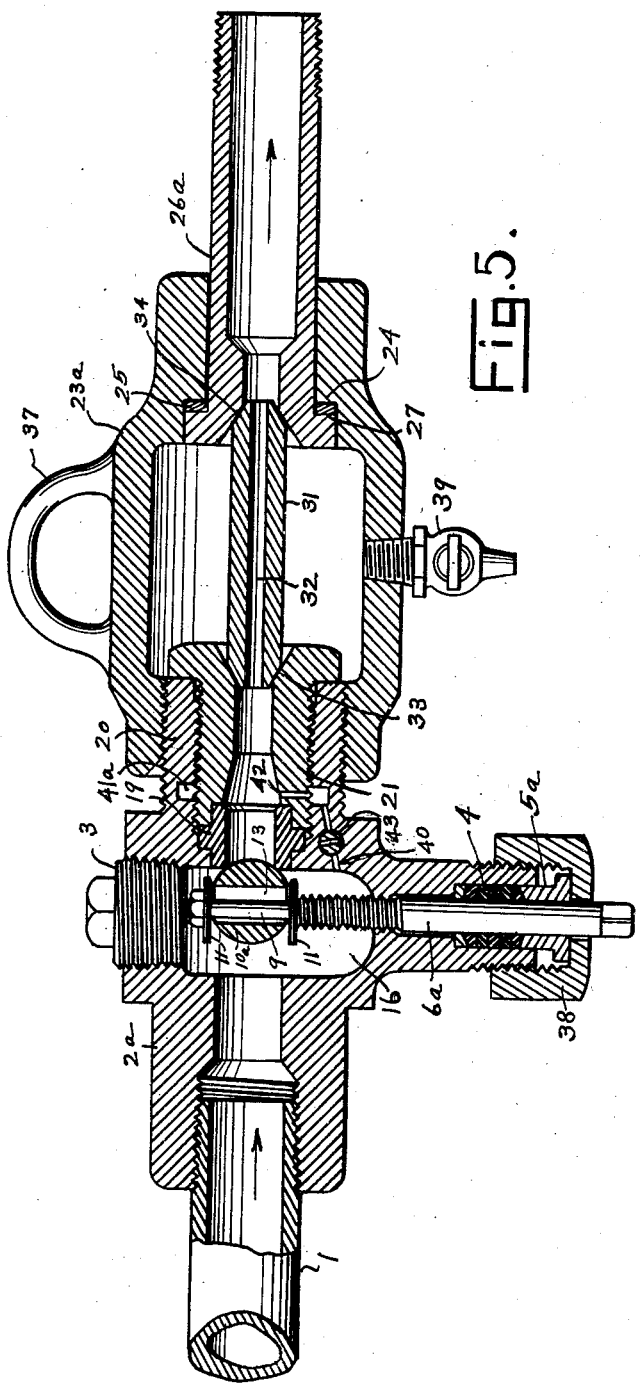
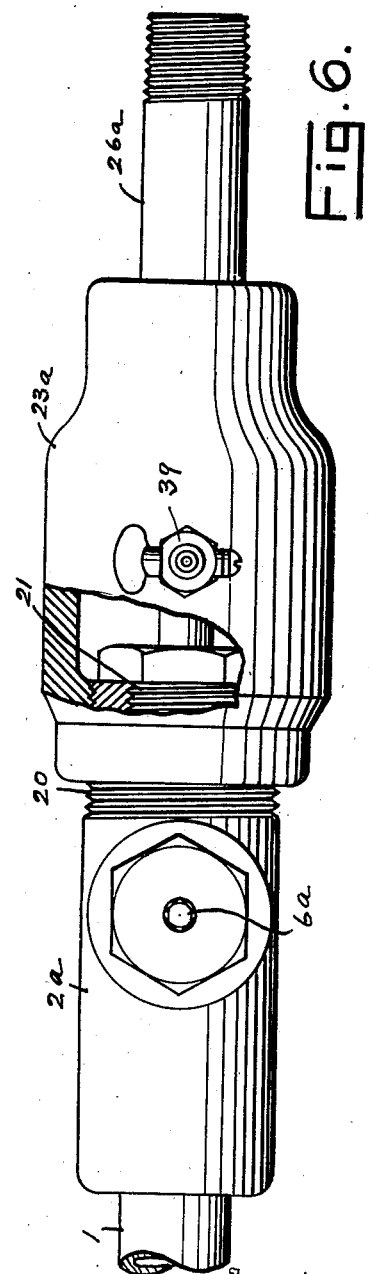
Inventor
Granville A. Humason
By
Edward V. Hardway
Attorney Patented Sept. 19, 1939

2,173,743

UNITED STATES PATENT OFFICE 2,173,743

VALVE FOR CHOKES

Granville A. Humason, Houston, Tex.

Application December 1, 1936, Serial No. 113,619

3 Claims. (Cl. 251—44)

This invention relates to a choke.

An object of the invention is to provide a choke adapted to be connected into a flow line from a producing well and designed for the purpose of restricting the flow.

Another object of the invention is to provide a choke having a flow bean with a restricted passageway therethrough and novel means for mounting the bean whereby it may be readily removed and replaced.

It is another object of the invention to provide a well attachment of the character described equipped with a novel type of valve whereby the passageway for the outflowing fluid may be readily and quickly opened and closed and wherein the valve will be maintained seated, to close the passageway, by the pressure of the fluid.

It is a further object of the invention to provide choke equipment for a flow line having a flow bean provided with a restricted passageway therethrough and mounted to be readily removed or replaced with a novel type of valve mechanism for closing the flow line while the flow bean is being removed and reinstalled.

It is a further object of the invention to provide, in a flow line choke, a removably mounted flow bean and a casing surrounding and protecting the flow bean and having inspection openings with removable closures for said openings.

With the above and other objects in view, the invention has particular relation to certain novel features of construction, operation and arrangement of parts, an example of which is given in this specification and illustrated in the accompanying drawings, wherein:

Figure 1 shows a longitudinal sectional view of the complete attachment.

Figure 2 shows a fragmentary longitudinal sectional view showing the parts in position for removing and replacing the flow bean.

Figure 3 shows a cross-sectional view taken on the line 3—3 of Figure 1.

Figure 4 shows a sectional view taken on the line 4—4 of Figure 1.

Figure 5 shows a longitudinal sectional view of a modified form of the equipment and Figure 6 shows a side elevation partly broken away and in section.

Referring now more particularly to the drawings wherein like numerals of reference designate the same parts in each of the figures, the numeral 1 designates the flow line leading from the well and through which the well fluid flows under pressure.

Connected into this line there is a valve casing 2 which is extended laterally and closed at one end with a plug 3 and provided with a stuffing box 4 at its other end, which stuffing box includes the conventional screw threaded gland 5. A valve stem 6 is slidable longitudinally through said gland and stuffing box and extends into the casing. This stem may be moved longitudinally through the stuffing box by means of a hand lever 7 which is pivotably fulcrumed at one end on the outer end of the link 8. The inner end of this link may be pivoted, for convenience, to the casing 2, as shown in the Figure 1. The inner end of the stem 6 is formed with a reduced spindle 9, on which is mounted the ball valve 10. This valve is retained against endwise movement on the spindle by means of the retainer discs 11, 11 as shown. It will be noted that the valve has a relatively large bore 13 therethrough through which the spindle 9 passes axially and the valve is normally maintained centered about the spindle 9 by means of a spiraled spring 14 whose outer turn is seated in an inside annular groove 15 in the valve and whose inner end is secured to the spindle 9.

The casing 2 has an elongated valve chamber 16 therein providing space for the free movement of the valve into open or closed position.

Aligned with the upstream section of the flow-pipe 1 the valve casing 2 has the passageway 17 entering the chamber 16 and leading from said chamber there is the passageway 18 through the valve seat 19. At its down stream side the casing 2 has the externally and internally threaded nipple 20 screwed into which is the tubular bushing 21 whose inner end abuts said seat and clamps it against the opposing shoulder 22 of the valve casing. As shown in Figure 1 the valve 10 is in closed position. It will be held in contact with the seat by the spring 14 and will be further maintained closely seated by the pressure of the oncoming liquid. Upon outward movement of the stem 6 the valve will be unseated, the enlarged bore 13 permitting lateral movement of the valve relative to the spindle 9 and the spring 14 yielding to permit such movement so that when the valve is moved to open position, it will clear the liquid passageway and assume the position shown in dotted lines in Figure 1.

The numeral 23 designates a cylindrical shaped housing one end of which is screwed onto the nipple 20. The other end of this housing has an inside annular shoulder 24 abutting which is a packing ring 25. A coupling member 26 is fitted outwardly through the last mentioned end of the housing and has an external annular shoulder 27 which abuts the packing ring 25. The outer end of the coupling member 26 has the reduced externally threaded pin 27 which is screwed into the internally threaded box 28 of the outer coupling member 29 into which the downstream section of the flow pipe 1 is threaded. The female coupling member 29 has an external annular shoulder 30 which abuts the opposing end of the housing 23, whereby said housing has a swivelling connection with the coupling.

There is a tubular flow bean 31 having a reduced axial bore 32 therethrough and whose ends are tapered to fit into correspondingly tapered seats 33, 34, of the bushing 21 and coupling member 27 respectively as shown in Figure 1.

Around, and preferably seated in grooves in, the tapered ends of the flow bean 31 shown in Figures 1 and 2 are the annular packing rings 31a, 31a, said packing rings also seating in annular grooves around the seats 33, 34 so as to form fluid tight joints. The flow bean of Figure 5 is not shown as being equipped with this packing in which case the tapered ends of the bean and the corresponding seats 33, 34 should be so shaped as to form close fitting joints to prevent leakage.

The housing 23 has oppositely arranged longitudinal openings 35, 35 which are dovetailed in cross section as indicated in Figure 3. These openings may be closed by the slide plates 36, 36, which are also dovetailed in shape to fit into said openings as also shown in Figure 3 and which have the handles 37, 37 for manipulating said plates.

The choke construction is assembled as shown in Figure 1, ready for use. Under normal flowing conditions the valve 10 will be moved to dotted line position shown in Figure 1 whereby the passageway through the flow line and through the choke will be open. The liquid conducted will usually contain gritty substances which will erode away the flow bean 31 and enlarge the passageway 32 therethrough thus allowin a flow of too much liquid. In such case the flow bean should be removed and a new one substituted. In order to perform this repair the valve 10 should be actuated into position opposite the seat 19 whereupon it will be seated by the spring 14 and the pressure of the liquid will maintain the valve securely seated to cut off the flow through the bean, and thereupon the housing 23 may be rotated to back it off of the nipple 20 to position shown in Figure 2. It may be turned either by the handles or grips 37 or by a wrench, and while being unscrewed will swivel with relation to the down stream section 1 of the flow line and will also force the seat 34 away from the seat 33 to permit release of the bean 31. The slide plates 36 may then be removed and the flow bean 31 taken out as indicated in Figure 2. A new bean may then be inserted and the housing screwed back onto the nipple 30 to securely seat the tapered ends of th bean against the seats 33, 34 and the slide plates 36 may then be replaced and the valve opened for continuation of the liquid flow.

In the form shown in Figures 5 and 6, the valve casing 2a is substantially the same as the valve casing 2 shown in Figure 1 but the valve stem 6a has a threaded connection with the casing and has the valve 10a located on the spindle 9 and retained thereon in the same manner as indicated in Figure 1. In this form the valve is loosely mounted on the spindle and is not normally retained in centered position by the spring 14. In this form the gland 5a, forming part of the stuffing box, is maintained in position to compress the packing by a flanged nut 38. In other respects the valve construction shown in Figure 5 is substantially the same as that shown in Figure 1. In this form the housing 23a is screwed onto the nipple 20 as in the form shown in Figure 1 but the housing 23a is continuous. At its opposite end it has the inside annular shoulder 24 which is abutting the packing ring 25. The coupling 26a is fitted outwardly through the housing and has the external annular shoulder 27 abutting said packing. The outer end of the coupling 26a is threaded for connection to the down stream section of the flow line. In this form the flow bean 31, having the axial passageway 32 and having its end tapered, is used. Its ends are seated in the seats 33, 34 of the bushing 21 and the coupling 26a. The housing 23a has grips or handles 37 as in the other form and is also provided with a drain cock 39 for testing purposes.

When it is desired to replace the flow bean 31 the valve 10a may be moved to closed position. In this form the valve is actuated by turning the stem 6a as is obvious. When the valve is in closed position it will be held securely closed by the pressure of the liquid and the housing 23a may be unscrewed from the nipple 20 to permit release and removal, and replacement, of the flow bean and when the latter is replaced the housing may be again screwed up on to the nipple 20.

When the valve 10 or 10a, as the case may be, is closed, it will be subjected to the full force of the well pressure and if the pressure is high it may be difficult to open the valve without equalizing or partially equalizing the pressure. For this purpose a duct 40 has been provided which leads from the chamber 16. In the form shown in Figure 1 this duct communicates with the insisde channel 41 which surrounds the bushing 21 and which communicates with the passageway through the attachment on the downstream side of the valve. This communication is afforded through the duct 42. In the form shown in Figure 5, the channel 41 is formed around the inside of the nipple 20 and communicates with the liquid passageway on the downstream side of the valve 10a through the duct 42.

In each form the duct 40 is controlled by a turnable valve 43 whereby said duct may be opened and closed. Normally the valve 43 will be turned to close the corresponding duct 40. The flow line 1 is usually equipped with a gate valve on the downstream side of the choke. If it be desired to open the valve 10 or 10a, as the case may be, this gate valve may be closed and the valve 43 may be turned to open the duct 40 whereby the pressure above and below the valve 10 or 10a, will be equalized and upon equalization of said pressure the valve 10 or 10a, will be initially moved to unseated position and then may be easily fully opened by the actuation of its stem as hereinabove explained.

The drawings and description disclose what is now considered to be preferred forms of the invention by way of illustration only while the broad principle of the invention will be defined by the appended claims.

What I claim is:

1. A valve including, a housing, a valve seat within the housing, a valve stem having a reduced portion and movable transversely of the valve seat, a ball valve arranged to co-act with said seat to control the flow through the housing, the ball valve having an enlarged bore through which the reduced portion of the stem extends, means for retaining said ball valve upon said reduced portion, whereby said ball valve is loosely confined thereupon so as to be freely rotatable upon said reduced portion, and yieldable means for centering said ball valve upon said portion.

2. In a flow line valve including, a valve housing, a bevelled seat within the housing and in alignment with the flow line, a valve stem mounted within the housing and movable transversely of the valve seat, a ball carried by the valve stem and arranged to engage said valve seat, the ball valve having a bore of greater diameter than said stem, whereby said ball valve is loosely mounted thereupon and may be moved into and out of seated position, and resilient means for centering the valve on the stem.

3. In a flow line valve including, a valve housing, a bevelled seat within the housing and in alinement with the flow line, a valve stem mounted within the housing and movable longitudinally within the housing and transversely of the valve seat, a ball valve carried by the valve stem and arranged to engage said valve seat, the ball valve having a bore of greater diameter than said stem, whereby said ball valve is loosely mounted thereupon and may be moved into and out of seated position, and resilient means for centering the valve on the valve seat.

GRANVILLE A. HUMASON.